(12) United States Patent
Karwowski et al.

(10) Patent No.: US 9,820,499 B2
(45) Date of Patent: Nov. 21, 2017

(54) PRODUCTION OF WHOLE GRAIN RICE SHREDDED PRODUCT

(71) Applicant: Intercontinental Great Brands LLC, East Hanover, NJ (US)

(72) Inventors: Jan Karwowski, Franklin Lakes, NJ (US); Vani Vemulapalli, Whippany, NJ (US); Barbara E. Baumann, Bedminster, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 138 days.

(21) Appl. No.: 14/351,015

(22) PCT Filed: Oct. 12, 2012

(86) PCT No.: PCT/US2012/060006
§ 371 (c)(1),
(2) Date: Apr. 10, 2014

(87) PCT Pub. No.: WO2013/056081
PCT Pub. Date: Apr. 18, 2013

(65) Prior Publication Data
US 2014/0314941 A1    Oct. 23, 2014

Related U.S. Application Data

(60) Provisional application No. 61/546,308, filed on Oct. 12, 2011.

(51) Int. Cl.
*A23L 1/10*        (2006.01)
*A23L 7/10*        (2016.01)
(Continued)

(52) U.S. Cl.
CPC .............. *A23L 1/1033* (2013.01); *A23L 7/10* (2016.08); *A23L 7/117* (2016.08); *A23L 7/122* (2016.08);
(Continued)

(58) Field of Classification Search
CPC .......... A23L 1/10; A23L 1/1025; A23L 1/164; A23L 1/1645; A23L 1/646; A23L 7/10;
(Continued)

(56) References Cited

U.S. PATENT DOCUMENTS 502,378 A    8/1893  Perry et al.
2,013,003 A  7/1931  Loose
(Continued)

FOREIGN PATENT DOCUMENTS

CA    674046 A    11/1963
CN    1523963 A    8/2004
(Continued)

OTHER PUBLICATIONS

International Search Report and Written Opinion, dated Jan. 10, 2013 for PCT/US2012/060006 (10 pgs.).
(Continued)

*Primary Examiner* — Walter A Moore
(74) *Attorney, Agent, or Firm* — Fitch, Even, Tabin & Flannery LLP (57) ABSTRACT

A method of preparing a whole grain rice shredded product is provided. The method includes the steps of combining water and a whole grain rice component, the whole grain rice component comprising at least about 75% by weight rice, or up to about 100% by weight rice, cooking the whole grain rice component and water to form a cooked whole grain rice material, cooling the cooked whole grain rice material, tempering the cooked whole grain rice material for less than about 90 minutes to form a tempered whole grain
(Continued)

rice material, and shredding the tempered whole grain rice material to form continuous net-like sheets of the whole grain rice shredded product.

14 Claims, 2 Drawing Sheets

(51) Int. Cl.
  *A23L 7/117* (2016.01)
  *A23L 7/122* (2016.01)
  *A23L 7/139* (2016.01)
(52) U.S. Cl.
  CPC .............. *A23L 7/139* (2016.08); *A23L 7/197* (2016.08); *A23L 7/1975* (2016.08)
(58) Field of Classification Search
  CPC .......... A23L 7/197; A23L 7/139; A23L 7/122; A23L 7/1975; A21D 13/04; A21D 13/047
  USPC .................................................. 426/618, 462
  See application file for complete search history.

(56) References Cited

U.S. PATENT DOCUMENTS

| | | | |
|---|---|---|---|
| 2,008,024 A | | 7/1935 | Loose |
| 2,600,532 A | * | 6/1952 | Hale ....................... A23L 7/126 165/89 |
| 2,693,419 A | | 11/1954 | Gager |
| 2,743,685 A | * | 5/1956 | Hale ..................... A23L 1/1643 264/DIG. 70 |
| 4,004,035 A | | 1/1977 | Hirzel et al. |
| 5,182,127 A | * | 1/1993 | Schwab .................... A23L 5/34 426/241 |
| 5,196,218 A | * | 3/1993 | Schwab ................... A23B 9/04 426/241 |
| 5,595,774 A | | 1/1997 | Leibfred et al. |
| 5,707,448 A | | 1/1998 | Cordera et al. |
| 6,004,612 A | | 12/1999 | Andreski et al. |
| 2006/0246193 A1 | | 11/2006 | Karwowski et al. |
| 2006/0246195 A1 | * | 11/2006 | Karwowski ........... A23L 1/0017 426/516 |
| 2006/0246202 A1 | | 11/2006 | Karwowski et al. |
| 2008/0131582 A1 | * | 6/2008 | Karwowski ............. A23L 1/172 426/622 |
| 2008/0248165 A1 | * | 10/2008 | Akamittath ............. A23P 20/20 426/87 |
| 2011/0212237 A1 | | 9/2011 | Karwowski et al. |

FOREIGN PATENT DOCUMENTS

| | | |
|---|---|---|
| CN | 1864533 A | 11/2006 |
| EP | 1782697 A2 | 5/2007 |
| WO | 02065854 A2 | 8/2002 |

OTHER PUBLICATIONS

"The Terminology and Methodology Associated with Basic Starch Phenomena," Cereal Foods World, vol. 22, No. 3, pp. 306-311 (Mar. 1988).

The State Intellectual Property Office of P. R. China Notification of the First Office Action, dated May 6, 2015 for China Patent Application No. 201280061465/, English translation (16 pgs.).

IP Australia Patent Examination Report No. 1, dated Nov. 3, 2014 for Australia Patent Application No. 2012322013 (3 pgs.).

* cited by examiner

Fig. 1

PRODUCTION OF WHOLE GRAIN RICE SHREDDED PRODUCT

CROSS-REFERENCE TO RELATED APPLICATIONS

This application is a U.S. national phase application of International Application No. PCT/US2012/060006, filed Oct. 12, 2012, designating the United States, which claims benefit of U.S. Provisional Application No. 61/546,308, filed Oct. 12, 2011, both of which are hereby incorporated herein by reference in their entirety.

FIELD

The present disclosure relates to a process for the production of shredded products, such as snacks and ready-to-eat cereals from whole grain rice.

BACKGROUND

Whole cereal grains are wholesome and nutritious and have been incorporated into a number of products. Shredded products have been historically made with whole grain wheat. Generally, in the production of shredded wheat, ready-to-eat cereal biscuits, and shredded wheat wafers from whole grains, a plurality of shredded layers are laminated upon one other, and the laminate is dockered, cut, and baked to provide products having a distinctly visible shred pattern on their opposing major surfaces. The shreds provide visual attractiveness and a unique, crispy texture and connote a healthy, hearty, natural product. Also, the shreds may provide increased surface area and deliver a robust flavor.

Wheat is often shredded because it has a composition that lends itself to be easily shred. To prepare wheat for shredding, whole wheat berries are generally cooked and then tempered, using prolonged tempering times. Wheat is generally easy to shred over long periods after the cooking and tempering, for example up to about 24 hours after cooking. Whole wheat is unique in that it contains gluten that helps to retain water, and to provide cohesiveness and elasticity during machining even after prolonged periods of tempering. However, the same is not true for other grains because of their lack of gluten and their unique bran and chemical composition and changes that happen to the grains after cooking and tempering.

In conventional processes for producing shredded cereals, the grain is cooked and then permitted to temper to increase shred strength. Tempering of the cooked grains prior to shredding has generally been considered necessary for obtaining strong, continuous shreds. Cooked wheat or similar gluten containing grains are subjected to tempering times of up to or over 12 hours before shredding. In the manufacture of a whole wheat food product such as shredded wheat, whole wheat is cooked sufficiently to gelatinize the starch. Gelatinization is a function of water penetration into the whole berry, temperature, and time, for a given type of grain. The gelatinization of wheat starch involves a destruction of bonds in the crystalline regions of starch granules. Retrogradation is the return of the starch molecules to a crystalline structure, which is different from the original crystalline structures, upon cooling. Tempering permits the gelatinized wheat starch to slowly cool and permits water migration through the wheat particles to achieve a uniform water distribution within the particles. Retrogradation begins during the cooling process. In some cases, the time required for the tempering of cooked whole wheat is substantially reduced by cooling the wheat at a temperature of from 60° F. to about 70° F.

It is believed that for wheat, the tempering permits distribution of water and facilitates equilibration of the gluten network which provides cohesiveness for shredding. It is also believed that the retrogradation of wheat starch during tempering or after tempering is slow so as not to impede shredding or it forms a crystalline structure which permits shredding in the presence of gluten.

SUMMARY

Starch-based compositions, which have little or no gluten, when mixed with water, tend not to form dough that is cohesive at room temperature and may not be continuously machinable or sheetable. Machinability of dough made from ingredients having little or no gluten may be improved by forming dough under elevated temperature conditions, such as by steaming the ingredients. However, in the production of shredded products from cooked, tempered, non-glutenous whole grains such as corn, oats, rice, and sorghum, or their combinations, the shreddability of the material into long continuous shreds tends to decrease as tempering times increase or as the time between tempering and shredding increases. For example, cooked corn has a tendency to become hard and rubbery during the cooling and tempering process, it is believed, due to starch retrogradation. Also, storing of tempered low or no gluten grains in surge bins to accommodate mass production processes tends to increase starch retrogradation and hardness. The cooked, tempered cereal grains which become hardened or rubbery, tend to fracture during shredding or do not conform to shredding roll grooves for producing continuous, well-defined shredded net-like sheets. Tempering of non-glutenous grains, such as corn, oats, rice, and sorghum also helps to distribute water throughout the starch granules. It is believed that release of some soluble starch during cooking and distribution of the starch and water during tempering helps to provide cohesiveness. However, the amount released may be insufficient for continuous shreddability or the starch retrogradation may be too rapid and may provide a crystalline structure which impedes shreddability into long continuous shreds.

Thus, in accordance with one form, a method of preparing a whole grain rice shredded product is provided. The method includes the steps of combining water and a whole grain rice component, the whole grain rice component comprising at least about 75% by weight rice or up to 100% by weight rice, cooking the whole grain rice component and water to form a cooked whole grain rice material, cooling the cooked whole grain rice material, tempering the cooked whole grain rice material for about 0 to about 90 minutes to form a tempered whole grain rice material, and continuously shredding the tempered whole grain rice material to form the whole grain rice shredded product.

According to another form, a method of preparing a whole grain rice shredded product is provided. The method includes the steps of combining water and a whole grain rice component, the whole grain rice component comprising at least about 75% by weight rice or up to about 100% by weight rice, cooking the whole grain rice component and water to form a cooked whole grain rice material, cooling the cooked whole grain rice material, tempering the whole grain rice material for less than about 240 minutes to form a tempered whole grain rice material, pelletizing the cooked whole grain rice material to form whole grain rice pellets, and continuously shredding the whole grain rice pellets to form the whole grain rice shredded product.

According to one form, the rice is in the form of raw, whole kernel rice.

In one form, the cooking step is performed in a pressure cooker at a pressure of about 8 to about 22 psig.

In accordance with one form, the cooking step is performed at a pressure of about 8 to about 12 psig.

In another form, the whole grain rice component comprises at least about 95% by weight rice.

According to one form, the whole grain rice component comprises less than about 25% by weight whole grains other than rice.

In accordance with one form, the cooking step causes the cooked whole grain rice material to have a degree of gelatinization of at least about 90%.

In one form, the cooked whole grain rice material is cooled to a temperature between about 70° F. and about 100° F.

According to one form, the pelletizing step is performed at a pressure between about 200 to about 600 psig.

In accordance with one form, the pelletizing step is performed at a pressure between about 400 to about 500 psig.

In one form, a whole grain rice shredded product is provided that is prepared by a process including combining water and a whole grain rice component, the whole grain rice component comprising at least about 75% by weight rice or up to about 100% by weight rice, cooking the whole grain rice component and water to form a cooked whole grain rice material, cooling the cooked whole grain rice material, tempering the cooked whole grain rice material for less than about 240 minutes to form a tempered whole grain rice material, and shredding the whole grain rice pellets to form the whole grain rice shredded product.

DETAILED DESCRIPTION

The present disclosure provides a method for making shredded whole grain rice products, such as ready-to-eat brown rice cereals, and brown rice-based sweet and savory snacks, such as chips, crackers, wafers, biscuits, and other products. In one aspect, it has been discovered that certain combinations of processing conditions and parameters may be effective to enable the whole grain rice, which has no gluten, to be easily shred into continuous net-like sheets having 1 or more layers.

For example and by one approach, it is believed that certain cooling temperatures after cooking in combination with certain tempering times and temperatures may be effective in combination to enable the whole grain rice to be in a form suitable for continuous shredding into continuous net-like sheets without substantial breakage of the shredded sheets. By other approaches, it has been discovered that certain post baking and final textures of the whole grain rice products may be desired, and may be indicative of process parameters and conditions effective to achieve desired results and shreddability when using whole grain rice, such as brown rice, as a base ingredient. For example, a final product texture of about 1500 to about 2500 gmf (Texture Analyzer TA-XT2) provides a suitable shredded product. In one approach, certain post-baking or intermediate textures in combination with certain oil ratios may be effective to achieve the desired results. For example, a post-baking texture or intermediate texture effective to achieve the desired results is generally from about 1500 to about 2500 gmf and, subsequent to baking, an oiling application and certain oil ratios may be effective to achieve the final target texture range of about 1000 to about 2000 gmf.

In another approach, a four layer triangular shaped shredded product may be produced without oil as a thin crisp having a texture of about 1500 to about 2500 gmf and with oil having a texture of about 1000 to about 2000 gmf. According to one approach, a five layer square shaped shredded product produced without oil may have a texture of about 3500 to about 5500 gmf and with oil having a texture of about 3000 to about 5000 gmf. To achieve such final texture, it has been discovered that process variables may need to be carefully controlled.

In yet another approach, cooking aides, such as disodium phosphate and oils, may be employed in the cooking step to enhance cooking when using whole grain rice. The disodium phosphate may enable faster cooking times, and the oil may be used as an anti-sticking agent. In other embodiments, the whole grain rice may be ground or may be unground as needed for particular applications.

In some embodiments, it is believed that the process variables effective to achieve the desired final product texture when using a whole grain rice as a starting material may be as follows:

| Variable | Value |
| --- | --- |
| Pressure cook | 8-22 psi |
| Moisture | 33-40% |
| Cooking time | 25-40 min |
| Temperature after cooling | 70-100° F. (depending on without pelletizing or with pelletizing) |
| Tempering time | 0-240 min (up to 90 minutes without pelletizing and up to 240 minutes with pelletizing) |
| Baking temperature | 350-550° F. |
| Post-baking moisture | 1.5-3.5% |
| Post-baking texture (TA-XT2) | 1500-5500 gmf |
| Topical oil, % | 5-15% |
| Post-oiling texture (TA-XT2) | 1000-5000 gmf |

In other aspects, it has been discovered that a combination of process cook pressure and particular seasoning types may also result in the most desired products in some applications. By one approach, low cook pressures, such as about 8 to about 22 psi (in other approaches, about 12 psi) in combination with a sea salt and black pepper seasoning was effective to form the most desired products when shredding whole grain rice into shredded snacks. The shredded product may include between 2 and 6 layers, but may contain more or less depending on the particular applications.

The whole grain rice employed may be, in one approach, raw or uncooked. A number of different rice varieties may be used, including, but not limited to, small, medium and long grain brown rice or other whole grain rice cultivars in various colors and flavor profiles. In one form, the rice is long grain rice. According to one embodiment, the rice is in a whole kernel form while in another embodiment, the rice has been ground, cooked, cooled, tempered, and then pelletized. In some cases, the starch of the whole grain rice employed may be all or essentially all individual, crystalline starch granules, as determined by light microscopy starch characterization where a sample is stained with Lugol's Iodine and observed in Brightfield Optics.

Optionally, whole seeds or comminuted seeds or legumes, such as soy beans or soy bean grits may be admixed with the whole grain rice to enhance protein content so long as the amount does not adversely affect shreddability. Exemplary amounts of the seeds or legumes that may be employed may range up to about 60% by weight, based upon the total weight of the whole grain rice. Vegetables and other inclusions may also be added to the body of the shredded product, such as in the cooker, between layers and/or topically on the surface of the shredded product.

Similarly, other whole grains may be added to the composition to provide a multi-grain product. For example, wheat may be added, such as a minor component to the rice. In this regard, the whole grain rice may make up at least about 75% of the overall whole grain components. In other words, the whole grain components may include about 75% whole grain rice and about 25% wheat. It should be noted that the whole grain component may comprise about 75% to about 100% whole grain rice. Other whole grain materials may also be included in the whole grain component.

The shredded whole grain rice foods such as ready-to-eat cereals, crackers, wafers, biscuits, or snack chips may be full-fat, reduced-fat, low-fat, or no-fat products. As used herein, a reduced-fat food product is a product having its fat content reduced by at least about 25 percent by weight from the standard or conventional product. A low-fat product has a fat content of less than or equal to three grams of fat per reference amount or label serving. However, for small reference amounts (that is, reference amounts of about 30 grams or less or two tablespoons or less), a low-fat product has a fat content of less than or equal to about 3 grams per about 50 grams of product. A no-fat or zero-fat product has a fat content of less than about 0.5 grams of fat per reference amount and per label serving. For accompaniment crackers, such as a saltine cracker, the reference amount is about 15 grams. For crackers, or biscuits or wafers, used as snacks, and for cookies, the reference amount is about 30 grams. Thus, the fat content of a low-fat cracker, wafer, or cookie would therefore be less than or equal to about 3 grams of fat per about 50 grams or less than or equal to about 6 percent by weight fat, based upon the total weight of the final product. A no-fat accompaniment cracker would have a fat content of less than about 0.5 grams per about 15 grams or less than about 3.33 percent by weight, based upon the weight of the final product. A no-fat wafer having a label serving size of about 32 grams would have a fat content of less than about 0.5 grams per about 32 grams or less than about 1.56 percent by weight, based upon the weight of the final product.

If desired, oleaginous compositions which may be used in producing full-fat, reduced-fat, or low-fat shredded products in accordance with the present disclosure may include any known shortening or fat blends or compositions useful for baking or frying applications, and they may include conventional food-grade emulsifiers. Vegetable oils, lard, marine oils, and mixtures thereof, which are fractionated, partially hydrogenated, and/or interesterified, are exemplary of the shortenings or fats which may be used. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions include naturally occurring triglycerides derived from vegetable sources such as soybean oil, palm kernel oil, palm oil, canola oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Examples of oleaginous compositions that could be used include partially hydrogenated soybean oil, palm oil, and mixtures thereof.

In some approaches, the amount of vegetable shortening or fat topically applied to shredded products may be reduced by more than about 25 percent by weight to obtain reduced fat products having, for example, less than about 12 weight percent fat, preferably less than about 10 percent by weight fat, based on the total weight of the baked or fried, finished product.

To provide a more lubricious mouthfeel to reduced fat, low-fat or no-fat products, a hydrocolloid gum, such as guar gum, may be employed to compensate for the fat reduction as disclosed in U.S. Pat. No. 5,595,774 to Leibfred et al., the disclosure of which is herein incorporated by reference in its entirety. If used, the hydrocolloid gums could be added in effective amounts that provide a lubricous, smooth, non-slippery mouthfeel to the baked or fried product. Exemplary amounts of the hydrocolloid gum, such as guar gum, that may be used range from about 0.15 percent by weight to about 1.5 percent by weight, in other cases, from about 0.25 percent by weight to about 0.45 percent by weight, based upon the total weight of the whole berries or grains. Other gums that may be used with guar gum include xanthan gum and carboxymethyl cellulose, and gums which form gels such as alginate gum, carrageenan gum, gum arabic, gum tragacanth, pectin, and locust bean gum, and mixtures thereof. Generally, the greater the extent of shortening or fat reduction, the greater the amount of gum utilized to compensate for the loss of lubricity or loss of smoothness in mouthfeel.

Figure 1:
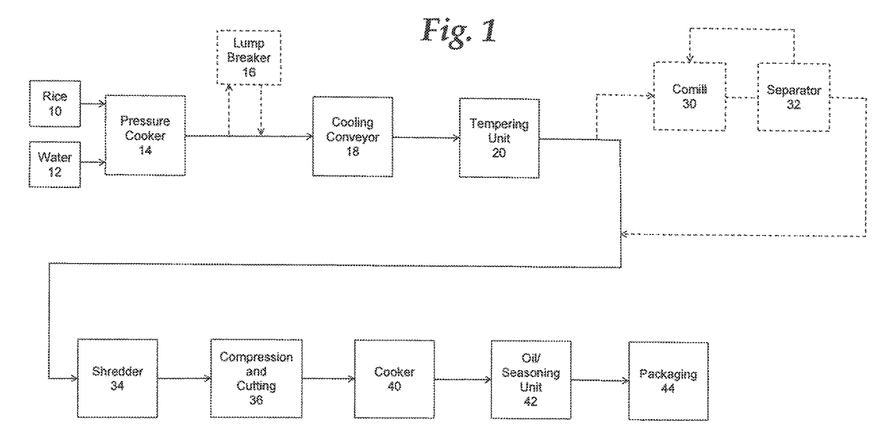
FIG. 1 is a flow chart providing an exemplary method of producing a whole grain rice shredded product that does not utilize pelletizing.

Turning to FIG. 1, a whole grain shredded rice food product may be produced continuously on a mass production basis by admixing whole grain rice 10 with water 12 and cooking the whole grain particles, such as in pressure cooker 14, to at least substantially gelatinize starch of the whole grain rice. In one form, the rice may be whole kernel rice that is cooked at a low pressure, such as about 8 to about 20 psi for about 25 to about 40 minutes.

The cooking of the rice can be done in any standard cooking equipment, such as a rotary cooker, or pressure cooker, such as a Baker Perkins cooker. Pressure cooking is preferred because it quickly achieves full cooking or gelatinization of the whole grain particles with no, or essentially no white centers. The rice may be cooked at effective temperatures and humidities that hydrate and at least substantially gelatinize the internal structure of the rice such that only a pin head of white or free starch remains visible in the center of the kernel. The degree of gelatinization may for example, be at least about 90 percent. In some embodiments, the starch is essentially 100 percent gelatinized leaving no visible white centers in the whole grain particles. The degree of starch gelatinization may be measured by Differential Scanning calorimetry (DSC). Gelatinization may be defined as the collapse (disruption) of molecular order within the starch granule, manifested in irreversible changes in properties such as granular swelling, native-crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following gelatinization in the dissolution of starch. It involves increased granular swelling, exudation of molecular components (i.e., amylose, followed by amylopectin) from the granules, and eventually, total disruption of the granules. See Atwell et al., "The Terminology And Methodology Associated With Basic Starch Phenomena," Cereal Foods World, Vol. 33, No. 3, pp. 306-311 (March 1988).

By one approach, exemplary pressure cooking pressures may range from about 8 psig to about 22 psig with cooking times ranging from about 25 minutes to about 40 minutes. In some applications, the pressure cooking may include a "come-up time" as in immersion cooking of between about 6.5 to about 8 minutes during which the temperature of the rice in the vat or cooking vessel is elevated from ambient temperature to the cooking temperature. In some cases, before cooking, the rice may be admixed with hot water at a temperature of about 170° F. to about 190° F. in the pressure cooker. The rice may be added to the hot water, or vice versa, in a rotating cooker, for example, over a time period, for example, of about 50 to about 100 seconds. Other ingredients such as salt, oil, emulsifiers, disodium phosphate and the like may be added in the cooker with the water as a pre-blend or added separately. By one approach, about 0.25 percent oil and/or emulsifiers may be added for anti-sticking. In another approach, about 2 percent or less of oil and/or emulsifiers may be added.

In some cases, pressure cooking may be preferred over immersion cooking because it provides better control over obtaining desired water content in the cooked rice and reduces or eliminates the need for drying of the cooked rice to achieve desired moisture content for shredding. Generally, in pressure cooking all of the water added is absorbed or taken up by the rice. In addition, steam which is directly injected into the pressure cooker condenses and is taken up by the rice, for example, generally in an amount of about 1 percent by weight to about 3 percent by weight, based upon the total weight of the cooked whole grain particles. Generally, draining of water after pressure cooking is not needed because all or substantially all of the added water and steam condensate is taken up by the cooked rice. The amounts of water uptake may vary depending on the particular application and other conditions. The moisture content of the cooked rice, which includes water inherently present in the raw rice, after draining if needed, may range from about 33 percent by weight to about 40 percent by weight, based upon the weight of the cooked brown rice.

During cooking, moisture tends to collect on the rice. This moisture can increase the stickiness of the cooked rice and can cause handling problems when the rice is transferred to other apparatus. Mixing the rice in the cooking vat at low rotation speeds provides for even cooking and reduces lumping. As mentioned above, oil and/or emulsifiers may be blended to the cooker to minimize stickiness and enhance handling through the shredding process.

In some applications, after draining of any excess cooking water and steam condensate formed during cooking, the cooked rice may be discharged from the cooker and optionally transferred to a surface dryer and cooler. In such case, the cooked rice may be dried and cooled to a temperature of less than about 135° F., for example from about 70° F. to about 100° F. The surface drying and cooling facilitates flow of the cooked grains as individual, discrete pieces. The dried, cooled rice may have a moisture content of from about 33 percent by weight to about 40 percent by weight, for shreddability into strong, continuous shreds.

Referring again to FIG. 1, the cooked rice may optionally be passed through a lump breaker 16 before it is co-milled, cooled, and tempered. The lump breaker may be used to break up any agglomerates from the pressure cooker 14. Further, the de-lumped whole rice may then be optionally co-milled (not shown) to obtain smaller agglomerates of whole rice by passing through a screen, for example a 1 inch square screen. The co-milled agglomerates may range in size from about golf-ball sized to granular sized, preferably less than about 0.5 cm in diameter.

After cooking, the starch granules of the cooked brown rice is no longer crystalline in nature and are swollen or larger in size, as determined by light microscopy starch characterization using Lugol's Iodine. The cooked rice may contain swollen granules as well as agglomerated starch clusters.

After de-lumping and/or co-milling, the rice is preferably cooled to a temperature ranging from about 70° F. to about 100° F. Any standard cooling equipment or methods can be used. For example, the cooked rice may be cooled, such as by being passed along a cooling conveyor 18, and then tempered in a tempering unit 20. The cooked whole rice particles may then be tempered or cured for a sufficient period of time to provide a uniform distribution of the water throughout the cooked whole grain particles. Tempering may be conducted at a temperature from about 70° F. to about 100° F. Tempering times may range from about 0 minutes to about 90 minutes for materials produced without pelletizing and from about 0 minutes to about 240 minutes for materials produced using pelletizing. The tempering or curing step may be accomplished in one or more stages. The tempered whole grain rice particles may be in agglomerated form, with the agglomerates ranging in size from about golf-ball sized to granular sized, preferably less than about 0.5 cm in diameter. According to one form, it has been discovered that if the rice, when not ground or pelletized, is tempered for longer than 90 minutes, it may begin to retrograde and therefore may begin losing shreddability properties.

The tempered, cooked, whole grain rice may optionally be mechanically sheared, worked or compacted to soften and plasticize its starch matrix prior to and/or after tempering, which it is believed the friction and heat may make the whole grain rice softer and more pliable and may reverse starch retrodragation if needed. Examples of suitable optional shearing or working may be completed using a forming extruder, or other high shear mixer to impart a high level of shear to the product. In one form, such as found in FIG. 2, an extruder 22 may be used in order to obtain whole grain rice formed pieces or pellets with extrusion being under pressure and temperature conditions to provide continuous shreddability of the whole grain formed pieces into continuous net-like sheets. In one form, if the whole grain rice is extruded/pelletized after tempering, the rice may be suitable for longer tempering times, such as up to about 240 minutes. Further, in the process of FIG. 2, the rice may also optionally be ground such that it is no longer in whole kernel form.

Upon entering the forming extruder, the tempered whole grain rice may be in the form of agglomerates. The agglomerates fed to the forming extruder may range in size from about golf-ball sized to granular sized, and may preferably be less than about 0.5 cm in diameter. Upon entry into the forming extruder, the tempered, whole grain rice may have a hard or rubbery texture. The starch of the tempered whole grain rice may be retrograded, with the starch being primarily granular, the starch granules being swollen, and some agglomerated starch clusters being present, as determined using light microscopy starch characterization with Lugol's Iodine.

Figure 2:
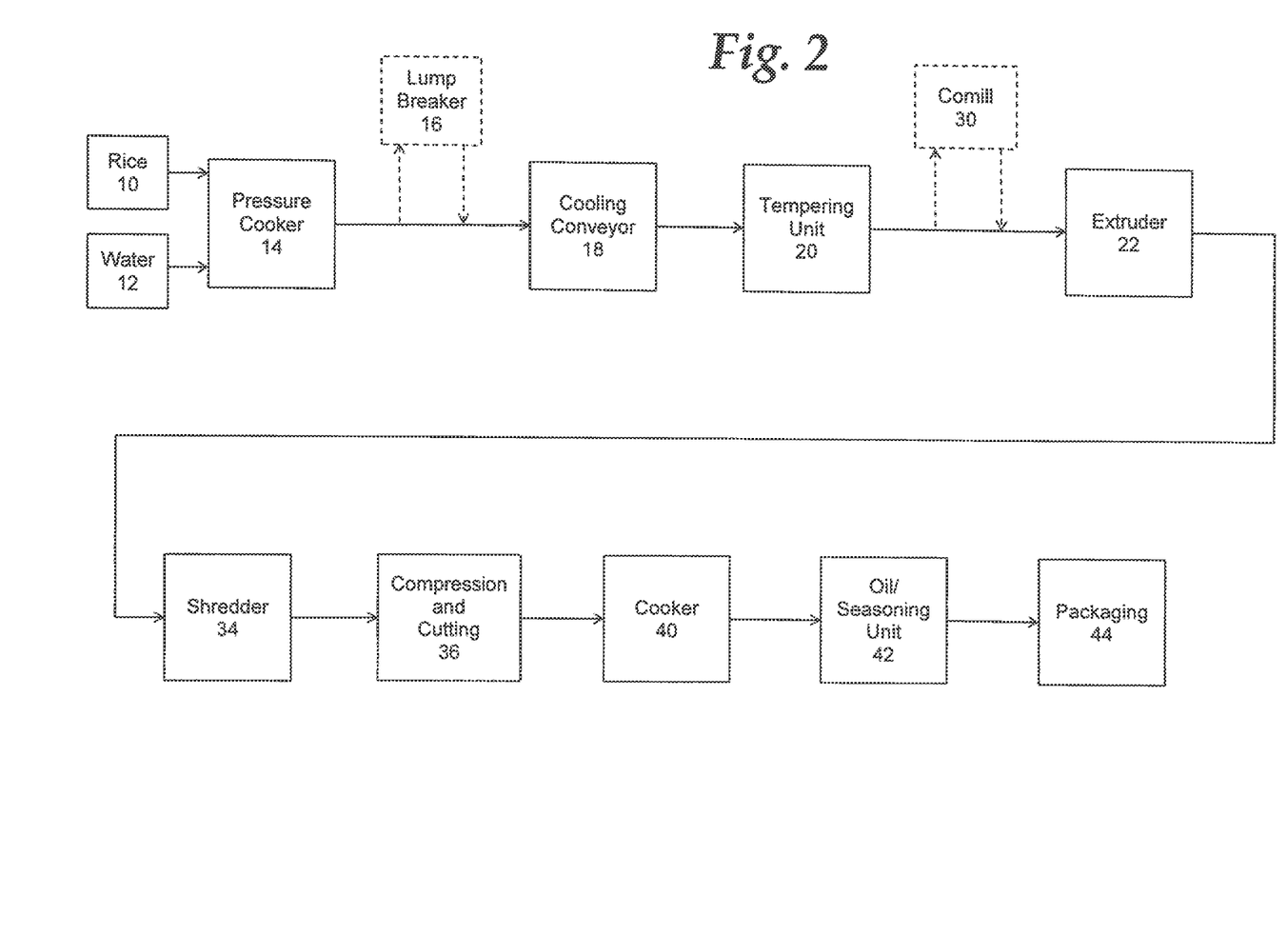
FIG. 2 is a flow chart providing an alternative, exemplary method of producing a whole grain rice shredded product that utilizes pelletizing.

If used, commercially available extruders, such as a Bonnet or a Wenger, may be employed to produce the shreddable, whole grain rice formed pieces from the agglomerates of cooked, tempered whole grain rice. The extruder 22 may be equipped with a solid or cut-flight screw conveyor for conveying and shearing of the tempered whole grain rice from the input end to the output end and through the exit die plate. Cooling jackets are preferably provided to control the temperature of the agglomerates in the extruder 22 and to control the temperature of the formed pieces exiting the forming extruder. The cooling jackets help to remove heat generated by the shearing action occurring in the extruder 22 and at the die plate as the agglomerates are forced through the die plate apertures.

If used, the extruder 22 may be equipped with an internal knife installed on the upstream side of an exit die plate, and an external knife installed on the downstream side of the exit die plate for forming the rice agglomerates into a rope or rod which is cut into whole grain formed pieces. The die plate may have a plurality of holes or apertures each having a diameter of about 3/16 inch to about 5/16 inch. The open area of the die plate, or the total area of the apertures as a percentage of the die plate area, may range from about 14 percent to about 55 percent, preferably from about 25 percent to about 45 percent, more preferably from about 38 percent to about 42 percent.

Again if an extruder is used, the whole grain rice formed pieces may be produced with dimensions for shredding on conventional shredding equipment. For example, the formed pieces may have a cut length of about 1/8 inch to about 1/4 inch, and a diameter of about 3/16 inch to about 5/16 inch imparted by the die apertures.

The extruding pressure, as measured at the die plate, may be from about 200 psig to about 600 psig, preferably from about 400 psig to about 500 psig. The pressures and temperatures employed preferably result in no or substantially no expansion of the extrudate exiting the die orifices. Also, the temperature of the formed pieces exiting the extruder should be sufficiently low so that any increase in temperature caused by the shredding operation does not result in deleterious sticking of the shreds to the downstream shredding rolls or compacting rolls.

When used, the whole grain rice formed pellets exiting the forming extruder have a soft, pliable, cohesive texture. In some cases, the extrusion is believed to reverse retrogradation of the tempered whole grain rice particles. High shear in the forming extruder, it is believed, substantially fractures retrograded starch granules and releases amylose and amylopectin to increase cohesiveness for shreddability into continuous net-like sheets. While the starch entering the forming extruder may be primarily granular, it may be quite different in the formed pieces exiting the forming extruder. The starch of the whole grain formed pieces produced by the forming extruder is primarily agglomerated starch and fragmented starch with only a small population of individual granules, as determined using light microscopy starch characterization with Lugol's Iodine.

In one form, upon exiting the extruder 22, the cooling of the formed pieces should not be so extensive, and the formed pieces should not be permitted to sit or temper too long, so as to induce substantial starch retrogradation or formed piece hardening which may impede shreddability and affect the texture of the finished product.

The whole grain rice or rice formed pieces may be transferred from the tempering unit 20 to an optional comill 30 and an optional separator 32 before shredding. In one form, the comill 30 may include 1" screen to break up large agglomerates. Further, in one form, the separator 32 may be a rotary separator which can be used to make a final size reduction of the agglomerates prior to shredding. If the agglomerates are still too large exiting the separator, they may be passed back to the comill 30.

The tempered whole grain rice or rice formed pieces may be transferred by means of conveyors and/or bucket elevators to a hopper which feeds a screw conveyor. The latter may transfer the whole grain to a series of shredding rolls or mills via flow tubes or hoppers. An example of such a screw conveyor is that made by the Screw Conveyor Corporation, 704 Hoffman Street, Hammond, Ind., 46327. Any conventional milling system can be used.

After tempering, and optional comilling and separating, the rice is shredded, such as in shredder 34. Shredder 34 may include, in one form, 4-6 shredding rolls to achieve the desired number of layers of material. The shredder 34 may shred the rice into whole grain net-like sheets.

A conventional milling system for making a wafer or biscuit may be employed in producing the shredded products such as ready-to-eat cereals, biscuits, and snack chips. The conventional milling system can comprise a pair of closely spaced rolls that rotate in opposite directions with at least one of the rolls having circumferential grooves. Upon passing between the rolls, the dough is formed into long individual strings or strands. A circumferentially grooved roll can also be grooved transversely to the circumferential grooves for the production of a net-like sheet. When sheets are formed, the sheets are comprised of interwoven shreds or strings. When the rolls are held tightly together, the shreds or filaments partially separate from each other but are more or less connected. When the rolls are sprung slightly apart under pressure, the adjacent filaments can be united to each other by very thin webs which stretch between them.

Upon passing between the rolls, the dough is deformed into the circumferential grooves and the optional crosshatching grooves. Each pair of rolls produces a dough layer having a plurality of generally parallel longitudinal strands and optionally a plurality of crosshatchings generally perpendicular to the strands. The crosshatchings and the longitudinal strands form an integral net-like sheet. The texture of each layer may be controlled by the number of crosshatchings in each layer forming the net-like sheets. The net-like sheets are preferably unwebbed or webless, i.e., the crosshatchings and longitudinal strands of each layer are not connected by a membrane. The use of an open space within the area formed by the longitudinal strands and the crosshatchings in the outer layers provides a more attractive product. Additionally, use of the open space in the inner layers avoids an excessively dense texture and moisture loss.

The longitudinal strands are produced by the circumferential grooves and may run in parallel with the direction of movement of an underlying conveyor. The crosshatchings of the dough layer are produced by the crosshatching grooves and may run generally perpendicular to the direction of movement of the conveyor. The shredding mills may be arranged in a linear series along the common underlying conveyor. Each of the shredded dough layers or sheets may be deposited on the conveyor in super-position, with their longitudinal strands running in the same direction. Conventional shredding systems which can be used in the process are disclosed in U.S. Pat. Nos. 502,378; 2,008,024; 2,013,003; 2,693,419; 4,004,035; and 6,004,612; and Canadian Patent No. 674,046.

The first and last one or more shredded dough layers to be deposited or laminated may have a number of crosshatchings so as to provide a region of denser texture or higher density in the biscuit or chip. In one form, one or more of the shredded dough layers may include 240 cross grooves. In one form, the first layer which is laid down upon the conveyor belt preferably has a sufficient number of crosshatchings to provide a more stable bed for the depositing of subsequent shred layers. Additionally, the outside appearance of the product is enhanced by the presence of crosshatchings as is the initial impression of crispness upon eating. For a 5 inch diameter shredding roll, the number of crosshatchings may be about 60 or more, equally spaced about the roll. Five inch diameter rolls may generally have: (1) about 10 to 22 circumferential grooves per inch, and (2) up to about 120 equally spaced crosshatching grooves. Larger or smaller diameter rolls may also be used with about the same frequency of grooves as the five inch diameter rolls.

In one approach, the whole grains are passed through two to six shredding heads with 120-grooved rolls to produce a desired number of layers.

The dough layers which are deposited between the outer layers providing a denser texture or higher density may have a decreased number of crosshatchings so as to provide a region of lighter texture or lower density in the interior of the chip. The number of crosshatchings in each layer may be the same or different.

In at least one embodiment, at least 30 percent of the total number of net-like sheets may provide one or more regions of dense texture or higher density. In preferred embodiments, each layer has the same number of cross-hatchings. In at least one embodiment, for increased durability, crispness, and visual appearance, 120 cross-hatchings for a five inch diameter roll is preferred.

The depth of the circumferential and cross-hatching grooves of the shredding rolls may be from about 0.010 inch to about 0.10 inch, preferably from about 0.016 inch to about 0.075 inch. For example, in preferred embodiments the cross-hatching groove depth may be about 0.018 inch and the circumferential groove depth may be about 0.075 inch. Groove depths of less than about 0.010 inch tend to require too many layers to achieve a desired weight per piece. The net-like sheets when laminated upon one another, do not necessarily line up exactly so that one layer is superimposed exactly on another layer. The greater the number of layers, the more likely the openings in one net-like sheet will be at least partly covered by the shreds of another net-like sheet. Thus, increasing the number of layers to achieve a given piece weight tends to result in a denser laminate and loss of shred integrity upon compression in compression rolls. The use of groove depths greater than about 0.10 inch tends to result in too dense of a laminate which is difficult to bake or fry into a crisp, chip-like texture.

Generally, the total number of net-like sheets may range from one to 21 depending upon the type and size of shredded product. For example, large sized ready-to-eat breakfast cereal biscuits or wafers may contain from about 1 to about 21 net-like sheets, preferably from about 1 to about 21 net-like sheets. Smaller sized ready-to-eat cereal biscuits or wafers may contain from 1 to 7, preferably from 1 to 6 net-like sheets. The snack chips may have 1 to 7, preferably 1 to 5, most preferably 4 net-like sheets. If the number of sheets is less than two, continuous, consistent production tends to be disrupted. The laminate tends to stick to or slip on the belt or compression roll upon substantial compression of a laminate which is relatively thin prior to compression. Additionally, with too few layers, the fried or baked product tends to be too fragile for handling on mass production packaging equipment or for dipping. If the number of sheets or layers is greater than seven, upon compression to achieve a desirable, chip-like thinness, the laminate becomes too dense and difficult to bake or fry into a crispy texture. In addition, excessive compression may result in a loss of a distinctive, shredded appearance.

Generally, the temperature of the shredded product out of the shredding rolls may be up to about 95° F. to about 115° F. without substantial sticking problems. If extruded, the extruding temperature may be controlled by use of the cooling jackets to provide a formed pieces temperature of from about 80° F. to about 120° F., preferably from about 90° F. to about 110° F., for example from about 95° F. to about 105° F., upon exiting the extruder die plate. Cooling air may be supplied at the exit of the plate to cool the exiting formed pieces to help avoid stickiness problems.

The shredded material may also be compressed together, such as in compression and cutting 36 to form a whole grain laminate. The compression and cutting 36 may include dockering wheels and structure to slit and score the whole grain laminate into a desired shape.

In at least one embodiment, the whole grain rice laminate may be compressed in accordance with the method and apparatus of U.S. Pat. No. 6,004,612 to Andreski et al. for "Production of Shredded Snacks with Chip-Like Appearance and Texture," the disclosure of which is herein incorporated by reference in its entirety. The apparatus and method of U.S. Pat. No. 6,004,612 may be used to obtain a whole grain shredded chip-like snack having a substantially uniform shredded net-like appearance and crisp, shredded texture by substantially compressing a laminate of whole grain net-like sheets of whole grain forming pieces obtained in accordance with the present methods. As disclosed in U.S. Pat. No. 6,004,612, the compression substantially reduces or eliminates air pockets or interlayer spacing and enhances interlayer adhesion so as to prevent the development of a puffed, pillowed, or thick biscuit or cracker-like appearance. In some cases, corrugated compression rolls result in a stronger product and unique surface appearance.

Even though the laminate undergoes substantial compression, substantially flat, unpuffed, chip-like products exhibit a substantially uniform shredded, net-like appearance upon their major surfaces. Additionally, individual shred layers are visually discernible in the baked or fried product when it is broken and viewed in cross-section. The strength of the laminate is sufficient to continuously undergo cutting, transferring, and packaging operations during mass production without tearing or breaking. Baked or fried chip-like shredded snacks are sufficiently strong for dipping into and scooping of dips or sauces without breaking. Additionally, chips made according to this process have a whole grain appearance, with portions of the hull or bran of the whole grains being visually apparent in numerous locations on the surface of shredded snack chips.

By some approaches, prior to compression, the thickness of the whole grain laminate may generally range from about 0.035 inch to about 0.250 inch. Generally, the thickness of the laminate is reduced by at least about 35 percent, generally from about 45 percent to about 60 percent of its thickness prior to compression. As disclosed in U.S. Pat. No. 6,004,612, compression of the laminate to substantially reduce its thickness may be achieved by passing it between at least one pair of counter-rotating corrugated or smooth compression rolls while it is supported upon and transported by a conveyor belt. Where more than one pair of compression rolls are employed, the total thickness reduction may be approximately equally divided between the pairs of rolls. Use of a single pair of counter-rotating corrugated or smooth compression rolls is preferred for achieving the substantial compression of the laminate.

Supporting the laminate upon a belt while it is being compressed helps to avoid excessive stretching and tearing or sticking of the laminate during compression and transport through the rolls. As disclosed in U.S. Pat. No. 6,004,612, each pair of counter-rotating rolls may comprise a top roll which contacts the top surface of the laminate, and a bottom roll which contacts the bottom surface of the conveyor belt which supports the laminate. The nip or gap between the counter-rotating rolls and their relative rotational speeds are set so as to substantially compress the laminate while avoiding: 1) substantial sticking of the laminate to the upper roll, or 2) substantial movement or slippage of the laminate relative to the belt, either of which would substantially disrupt or distort the shred pattern of the laminate as it is compressed. The bottom roll helps to maintain the linear speed of the separately driven conveyor belt as the top roll compresses the laminate against the top surface of the belt. The rotational speeds of the top and bottom rolls of a pair of counter-rotating rolls may be at least substantially the same, or essentially the same, depending upon the relative diameters of the rolls. If different diameter rolls are used, their rotational speeds, or angular velocities, may be adjusted to provide at least substantially the same linear velocity.

As disclosed in U.S. Pat. No. 6,004,612, the laminate is compressed by the counter-rotating rolls without cutting of the laminate or without molding of the laminate into individual pieces. The compression or thickness reduction is at least substantially uniform across the width of the laminate. The compression provides a thin, cooked, but dough-like compressed laminate and helps to prevent substantial puffing or expansion upon subsequent baking or frying. The thickness of the compressed laminate exiting the nip of the compression rolls is such so as to provide a thin, chip-like appearance upon baking or frying. In some embodiments of the present methods, generally the thickness of the compressed laminate may range from about 0.035 inch to about 0.120 inch, preferably from about 0.050 inch to about 0.100 inch, for example from about 0.060 inch to about 0.080 inch.

Even though the thickness of the laminate is substantially reduced, a substantially uniform shred pattern is visually apparent upon the opposing major surfaces of the baked or fried product. Additionally, at least substantially all, or all of the individual shred layers are generally visible to the naked eye upon breaking a baked or fried piece perpendicularly to its major surfaces. For example, if a baked or fried piece is broken in about half, a cross-sectional viewing of each piece may generally reveal the same number, or substantially the same number, of shred layers or net-like sheets as were present prior to compression.

The moisture content of the laminate prior to compression and after compression is generally at least substantially the same. Moisture contents of the laminate prior to and after compression may range from about 33 percent by weight to about 40 percent by weight. The starch of the laminates may be in the form of agglomerated starch clusters with virtually no individual starch granules, as determined using light microscopy starch characterization with Lugol's Iodine.

The whole grain laminates of shredded dough strands, layers or net-like sheets may then be dockered, cut, and slit using conventional equipment, such as rotary cutters and slitters. Dockering of the laminate is not necessary to prevent puffing or leavening. For at least one embodiment, a non-dockered piece is preferable because it is more chip-like in appearance. Also, dockering of a compressed laminate tends to produce excessively dense portions which are difficult to bake or fry out without scorching. For example, the whole grain rice laminate may be cut into pieces, either in the compression and cutting 36 or other structure.

The cutting operation may partially or completely cut the whole grain laminates into strips. The slitting operation may completely cut or score the strips so as to provide scored strips of unbaked or unfried ready-to-eat cereal biscuits or snacks with the unbaked or unfried biscuits or snacks tenuously connected to each other. The non-compressed or the compressed whole grain laminate may be edge trimmed and then partially cut into shaped pieces by a rotary cutter without substantial generation of scrap or recycle material. Then, the partially-cut laminate may be cut longitudinally in the direction of movement of the conveyor belt, and then transversely to the direction of movement of the conveyor belt without substantial generation of scrap or recycle material.

The cut pieces may then be further processed by baking or frying the whole grain pieces in a cooker 40 to obtain a baked or fried whole grain shredded food product. The cut, whole grain laminate may be baked, fried, and/or toasted in conventional equipment. Suitable ovens for baking the cut laminate include Proctor & Schwartz/Wolverine, Baker-Perkins, and Spooner ovens containing forced air and gas fired burners and a conveyor. Suitable equipment for frying includes Heat and Control, FMC/Stein oil fryers. The laminates may be toasted to enhance the flavor and brown the edges of the shredded products. Baking or frying of compressed laminates does not substantially puff or leaven them and provides a substantially flat, thin, chip-like appearance.

Temperature profiles used for baking, frying or toasting of the laminated preforms may generally be within the range of about 350° F. to about 550° F. Other temperatures may also be appropriate. The baking may be performed in a zoned oven using low oven velocity to avoid excess curling, separating or warping of the strips during baking. The total time for baking, frying and/or toasting may be such so as to avoid browning (except on the edges of the pieces). In some cases, it depends upon the number of shred layers, the size of the shredded product and the type of oven. The total time for baking, frying and/or toasting may range from about 3 minutes to about 10 minutes, but may vary depending on other factors. The cut, whole grain laminate may be fried and toasted in conventional frying and toasting equipment. Heat and Control of Hayward, Calif., and FMC/Stein of Sandusky, Ohio, make suitable fryers, which may have direct or indirect heated oil and a conveyor. The temperature profiles used in the fryer for frying and/or toasting may generally be within the range of about 300° F. to about 400° F., but may vary as needed for particular applications. The total time for frying and/or toasting may be less than about 3 minutes, for example, and the final moisture of the resulting product may be about 1 to about 3 percent by weight. In some instances, if the moisture of the resulting product is above about 3 percent by weight, then crispness may suffer; and if the moisture is less than about 1.5 percent by weight, then in some instances, the product may have excessive oiliness, a darker color, and a scorched flavor. After baking or frying, the starch of the products may be in the form of agglomerated starch clusters with virtually no individual starch granules, as determined using light microscopy starch characterization with Lugol's Iodine.

The post baking texture of the baked product is about 1,000 to about 5,500 gmf. An exemplary analyzer includes the Texture Analyzer TA-XT2 or Instron. The color of the final baked or fried product may be a substantially uniform off-white to golden tan color. The product may be topped with seasoning, salt, or other applications (for example, about 0.5 to about 6 weight percent, based on the total product weight) prior to baking or frying. The salt provides flavor and flavor enhancement. Some of the salt (NaCl) can be replaced with KCl or other salt substitutes.

The baked or fried whole grain shredded food product may then be oiled and seasoned to provide the desired file product texture, such as in oiling/seasoning unit 42. It should be noted that the oiling/seasoning unit 42 may take the form of multiple units or a single unit, depending on if oil and seasoning are both being applied and how they are being applied. Finally, the product may be passed on to a packaging unit 44 for final packaging. After baking or frying and before or after oil or seasoning addition to the strips, the conveyor movement, etc., breaks apart the scored strips to provide individual pieces of shredded product such as ready-to-eat cereals, biscuits, wafers, or chip-like snacks.

In embodiments where a thin, chip-like shredded snack is produced, the whole grain laminate may be substantially compressed to obtain a compressed laminate having a shredded net-like appearance, followed by cutting the compressed laminate into pieces and baking or frying of the pieces. The finished product exhibits crispy-crunchy texture and resistance to breakage.

In embodiments where a hydrocolloid gum is used, the hydrocolloid gum, such as guar gum, in dry, particulate, or powdered form may be admixed or blended with the cooked, tempered brown rice particles. Batch or continuous mixers or blenders can be used to mix the gum and the cooked, tempered brown rice particles or agglomerates to coat them with the gum substantially homogeneously. The dry gum adheres to the cooked, tempered moist rice particles, thus at least partially coating the rice particles without creating a sticky surface which would hamper or interfere with shredding. Upon shredding of the rice particles, the gum coating or particles are incorporated into and onto the individual strands or net-like sheets of dough formed by the shredding rolls.

The shape of the shredded products may be square, rectangular, parallelepiped, triangular, irregular shaped and the like. Shapes which minimize or eliminate waste or recycle are preferred. A most preferred shape for a chip-like snack is a triangular or substantially triangular shape. As disclosed in U.S. Pat. No. 6,004,612, to essentially eliminate waste, the triangles may be formed using a rotary cutter which cuts the compressed laminate so that the base of each triangle is parallel to the longitudinal axis or direction of movement of the laminate. To reduce breakage during and after cutting, the laminate is preferably cut so that the apex or point of a triangle in one row does not touch or intersect the apex or point of another triangle located in an adjacent row. In preferred embodiments, the cutter may cut the laminate into a plurality of longitudinal rows of triangular-shaped pieces so that the apex of a triangular piece of one row is located at or intersects about the midpoint of the base of a triangular piece of an adjacent row as shown in U.S. Pat. No. 6,004,612.

As disclosed in U.S. Pat. No. 6,004,612, it is also preferable to form or cut the triangular pieces with rounded, blunted or flat corners so as to eliminate sharp points which may break-off during rotary cutting or subsequent slitting or transferring of the cut laminate. For example, vacuum may be used for lifting and transferring a partially cut laminate from one conveyor belt to another. The presence of substantial amounts of broken-off points may clog the vacuum equipment. One or more, preferably all three corners or apexes of the triangular pieces may be rounded, flattened or blunted. For example, to obtain flattened or blunted corners on a substantially equilateral or isosceles triangular shaped piece, each corner may be formed, cut, or shaped at least substantially parallel to its opposing side or at least substantially perpendicular to an adjacent side by the rotary cutter.

Fat or shortening, when used, can be applied, preferably by spraying in oil form, to the top and bottom surfaces of baked or fried strips of snacks having no added fat or having only fat inherent in the cereal grain. The topical application of oil to baked or fried snacks having no other added fat may result in baked or fried products having a total fat content of about 5 percent by weight to about 15 percent by weight. A result of the oiling application is a change in texture of the oiled baked product to about 700 to about 5,000 gmf is expected. Optionally, use of a hydrocolloid gum may provide a slippery or smooth mouthfeel and a glossy appearance even with no added fat.

Whole grain rice shredded products may contain one or more additives (e.g., vitamins, minerals, colorants, flavorants, etc.) at effective levels of concentration. Exemplary thereof are sugars such as sucrose, fructose, lactose, dextrose, and honey, polydextrose, dietary fiber, seasonings and inclusions, such as onion, garlic, parsley, and bouillon, malt, wheat germ, nuts, cocoa, flavorants such as fruit flavoring, cracker flavoring, cinnamon, and vanilla flavoring, acidulants such as citric acid and lactic acid, preservatives such as TBHQ, antioxidants such as tocopherol and BHT, food colorant, emulsifiers such as Myvatex (a blend of distilled monoglycerides manufactured by Eastman Kodak), sodium stearoyl lactylate, lecithin, and polysorbate 60, nuts, seeds, ancient grains, other grains, protein, fiber, cheese, legumes, pulses, fillers, pastes, and vitamins and/or minerals. Examples of suitable vitamins and minerals include B-complex vitamins, soluble iron compounds, calcium sources such as calcium carbonate, vitamin A, vitamin E, and vitamin C. Also, non-fat dry milk solids (i.e., milk powder) or soybean protein may be added in an amount sufficient to create a final protein level of from about 10 to about 20 weight percent. Such additional ingredients may range up to about 30 weight percent, based on the total dry weight of the final product.

Additives, such as vitamins and minerals, may be dry blended with an optional hydrocolloid gum and then the dry blend may be admixed with the cooked, tempered whole grain particles. In other embodiments, enrichment with vitamins and minerals and/or other additives may be achieved by blending with the blended grain and optional gum mixture. For example, a dry multi-vitamin premix may be added with simultaneous mixing to a gum coated grain mixture at the entry of a screw conveyor to form a homogeneous composition. The resulting composition may be fed or dropped into a hopper, which supplies milling rolls. The multi-vitamin and optionally gum-coated grain composition may then be milled in shredding rolls and formed into shredded products.

Additives or fillings, particularly those which may adversely affect shredding, may also be incorporated into the shredded baked or fried goods by depositing them between shred layers during formation of the dough laminate. Sucrose, fructose, lactose, dextrose, polydextrose, fiber, milk powder, cocoa, and flavorants are exemplary of additives which may be deposited. Exemplary fillings for inter-shred layer deposition include fruit paste fillings, savory fillings, no-fat cheese powder fillings, confectionery fillings, and the like. The additives or fillings may be full-fat, no-fat, reduced-fat, or low-fat.

Additives may also be topically applied to the laminated structure before or after baking or frying. In the production of whole grain shredded snacks, additives are preferably topically applied rather than applied between layers so as to not adversely affect a thin, chip-like appearance. Topically applied oil may be used as a carrier for one or more additives, such as flavorants or seasonings. In this regard, such materials may be applied as a dry additive and/or as a slurry, such as when combined with oil or other liquid. Further, the additives may be applied to the top layer, bottom layer, and/or the intermediate layers. Topical application of additives may be achieved using conventional dispensing apparatus such as disclosed in U.S. Pat. No. 5,707,448 to Cordera et al., the disclosure of which is herein incorporated by reference in its entirety.

In some approaches, products of the present methods may have a moisture content of less than about 5 percent by weight, in some cases, about 0.5 to about 3 weight percent, and in other cases, about 1 to about 2 weight percent, based on the total weight of the baked or fried, finished product. The final product may be baked or fried to a shelf stable relative humidity or "water activity" of less than about 0.4, in other approaches, less than about 0.3. It may have a shelf stability of at least about 2 months, preferably at least about 6 months, when stored in proper, sealed packaging.

It will be understood that various changes in the details, materials, and arrangements of parts and components which have been herein described and illustrated in order to explain the nature of the methods and compositions may be made by those skilled in the art within the principle and scope as expressed in the appended claims.

What is claimed is:

1. A method for preparing a whole grain rice shredded product comprising:
    combining water and a whole grain rice component, the whole grain rice component comprising at least about 75% by weight rice in the form of raw, whole kernel rice;
    cooking the whole grain rice component and water to form a cooked whole grain rice material;
    cooling the cooked whole grain rice material to a temperature of about 70° F. to about 100° F.;
    tempering the cooked whole grain rice material, after the cooling and prior to shredding, for about 0 minutes at the temperature of about 70° F. to about 100° F.; and
    shredding the cooled, cooked whole grain rice material to form continuous net-like sheets of the whole grain rice shredded product;
    wherein the cooked whole grain rice material is not pelletized.

2. The method of claim 1 wherein the cooking step is performed in a pressure cooker at a pressure of about 8 to about 22 psig.

3. The method of claim 2 wherein the cooking step is performed at a pressure of about 8 to about 12 psig.

4. The method of claim 1 wherein the whole grain rice component comprises at least about 95% by weight rice.

5. The method of claim 1 wherein the whole grain rice component comprises less than 25% by weight whole grains other than rice.

6. The method of claim 1 wherein the cooking step causes the cooked whole grain rice material to have a degree of gelatinization of at least about 90%.

7. The method of claim 1 wherein the cooked whole grain rice material is cooled to a temperature between about 70° F. to about 100° F.

8. A method for preparing a whole grain rice shredded product comprising:
    combining water and a whole grain rice component, the whole grain rice component comprising at least about 75% by weight rice in the form of raw, long grain rice;
    cooking the whole grain rice component and water to form a cooked whole grain rice material;
    cooling the cooked whole grain rice material to a temperature of about 70° F. to about 100° F.;
    tempering the cooked whole grain rice material, after the cooling and prior to shearing, for about 0 minutes at the temperature of about 70° F. to about 100° F.;
    shearing the cooled, cooked whole grain rice material to form sheared cooked whole grain rice material; and
    shredding the sheared, cooked whole grain rice material to form the whole grain rice shredded product;
    wherein the cooked whole grain rice material is not pelletized.

9. The method of claim 8 wherein the cooking step is performed in a pressure cooker at a pressure of about 8 to about 22 psig.

10. The method of claim 8 wherein the cooking step is performed at a pressure of about 8 to about 12 psig.

11. The method of claim 8 wherein the whole grain rice component comprises at least about 95% by weight rice.

12. The method of claim 8 wherein the whole grain rice component comprises less than 25% by weight whole grains other than rice.

13. The method of claim 8 wherein the cooking step causes the cooked whole grain rice material to have a degree of gelatinization of at least about 90%.

14. The method of claim 8 wherein the cooked whole grain rice material is cooled to a temperature between about 70° F. and 120° F.

* * * * *